United States Patent
Hiratomo

(10) Patent No.: US 8,169,785 B2
(45) Date of Patent: May 1, 2012

(54) ELECTRONIC DEVICE AND COMPONENT

(75) Inventor: Shinji Hiratomo, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/853,982

(22) Filed: Aug. 10, 2010

(65) Prior Publication Data

US 2011/0157836 A1 Jun. 30, 2011

(30) Foreign Application Priority Data

Dec. 25, 2009 (JP) ................................. 2009-296289

(51) Int. Cl.
*H05K 5/00* (2006.01)

(52) U.S. Cl. .................. 361/730; 361/801; 361/803

(58) Field of Classification Search .................. 361/730, 361/752, 796, 800–803, 807, 810, 797
See application file for complete search history.

(56) References Cited

U.S. PATENT DOCUMENTS

| | | | |
|---|---|---|---|
| 5,122,927 A | | 6/1992 | Satou |
| 5,446,618 A | * | 8/1995 | Tetsuya et al. ........... 361/679.37 |
| 5,764,477 A | * | 6/1998 | Ohgami et al. .......... 361/679.55 |
| 6,583,600 B2 | * | 6/2003 | Haga et al. .................... 320/110 |
| 7,333,324 B2 | * | 2/2008 | DeLuga ..................... 361/679.55 |
| 7,646,613 B2 | * | 1/2010 | Ligtenberg et al. ........... 361/801 |
| 2006/0146489 A1 | * | 7/2006 | Huang et al. .................. 361/683 |

FOREIGN PATENT DOCUMENTS

| | | |
|---|---|---|
| JP | H03-145195 | 6/1991 |
| JP | 08-111213 | 4/1996 |
| JP | H08-111213 | 4/1996 |
| JP | 11-345038 | 12/1999 |
| JP | H11-345038 | 12/1999 |

OTHER PUBLICATIONS

Notice of Reasons for Rejection mailed by the Japan Patent Office on Oct. 19, 2010 in the corresponding Japanese patent application No. 2009-296289 in 5 pages.
Notice of Reasons for Rejection mailed by the Japan Patent Office on Jan. 25, 2011 in the corresponding Japanese patent application No. 2009-296289 in 4 pages.

* cited by examiner

*Primary Examiner* — Hung S Bui
(74) *Attorney, Agent, or Firm* — Knobbe, Martens, Olson & Bear, LLP

(57) ABSTRACT

According to one embodiment, an electronic device includes: a device main body, a first engage portion; an operation element; and a disengage mechanism. The device main body includes component container detachably housing a component. The first engage portion is provided to the device main body and facing inside the component container, and when the component is housed in the component container, engaged with a second engage portion provided to the component. The operation element is provided on a rear wall of the device main body, the rear wall being a side wall of the device main body provided at a further side of the device main body and extended in a width direction of the device main body. The disengage mechanism moves the first engage portion in accordance with an operation of the operation element to disengage the first engage portion and the second engage portion from each other.

8 Claims, 12 Drawing Sheets

ELECTRONIC DEVICE AND COMPONENT

CROSS-REFERENCE TO RELATED APPLICATIONS

This application is based upon and claims the benefit of priority from Japanese Patent Application No. 2009-296289, filed on Dec. 25, 2009, the entire contents of which are incorporated herein by reference.

FIELD

Embodiments described herein relate generally to an electronic device and a component.

BACKGROUND

Japanese Patent Application Publication (KOKAI) No. H11-345038 discloses a conventional electronic device in which a component is detachably mounted in a component container formed in a housing. The conventional electronic device is provided with an operating element to lock the mounted component or to unlock (detach) the mounted component on a left side face or a right side face of the housing.

However, because the operating element is arranged on the left side face or the right side face of the housing, when a user touch the operation element by mistake, the component might be accidentally unlocked (detached).

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
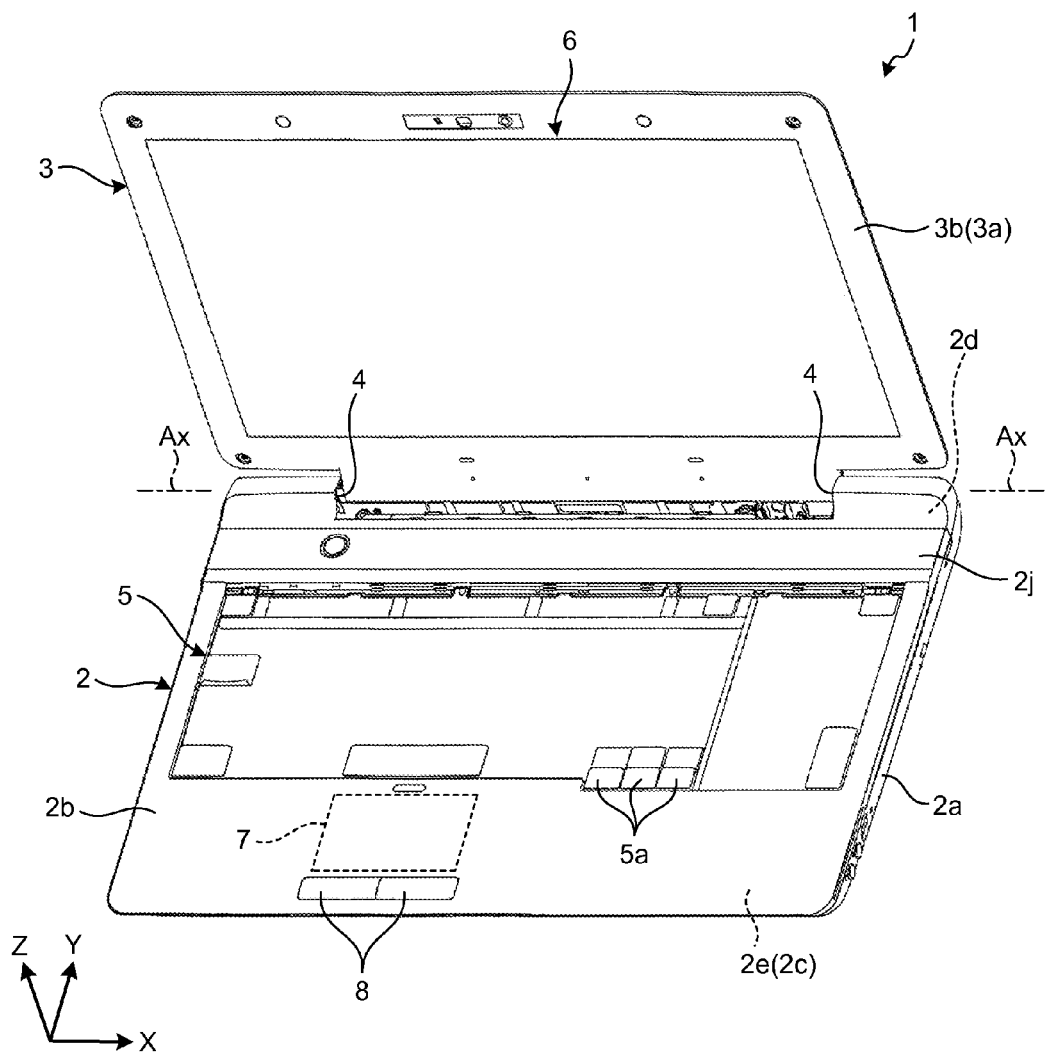
FIG. 1 is an exemplary perspective view of an electronic device according to an embodiment.

In general, according to one embodiment, an electronic device comprises: a device main body; a first engage portion; an operation element; and a disengage mechanism. The device main body comprises a component container detachably housing a component. The first engage portion is provided to the device main body and facing inside the component container, and when the component is housed in the component container, engaged with a second engage portion provided to the component. The operation element is provided on a rear wall of the device main body. The rear wall is a side wall of the device main body provided at a further side of the device main body and extended in a width direction of the device main body as seen while the electronic device is in use. The disengage mechanism is configured to move the first engage portion in accordance with an operation of the operation element to disengage the first engage portion and the second engage portion from each other.

Further, according to another embodiment, an electronic device comprises: a module; a first housing; a second housing; a hinge; a slider portion; and a lock portion. The module is provided with an engage portion. The first housing comprises: an end portion; a wall portion provided with an opening portion housing the module; and a periphery wall provided at a periphery edge of the wall portion. The second housing houses a display device comprising a display screen. The hinge is connected to the end portion of the first housing, and rotatably connects the first housing and the second housing with each other. The slider portion is positioned at the periphery wall near the end portion of the first housing. The slider portion is configured to be movable between an engage position at which the slider portion is engaged with the engage portion and a disengage position at which the slider portion is disengaged from the engage portion. The lock portion is integrally provided with the slider portion, and fixed to a predetermined position of the slider portion.

In the following, embodiments are explained in details with reference to the drawings. In one embodiment, as a matter of convenience, by taking an electronic device 1 under use as a reference, a width direction (left and right direction) of a first main body 2 is defined as X direction, a depth direction of the first main body 2 as seen by a user is defined as Y direction, and a thickness direction of the first main body 2 is defined as Z direction. An X axis, a Y axis, and a Z axis are orthogonal with each other. For the drawings of each component, the directions are indicated while the components are attached to the electronic device 1. In the following, a near side of the depth direction (Y direction) is indicated as a front side, and a far side of the depth direction is indicated as a rear side. Further, a front face side of the thickness direction (Z direction) is indicated as a top side, and a back face side of the thickness direction is indicated as a bottom side.

As illustrated in FIG. 1, the electronic device 1 according to the embodiment is configured as a notebook type personal computer (PC), and comprises the rectangular flat first main body 2 and a rectangular flat second main body 3. The first main body 2 and the second main body 3 are rotatably connected with each other around a rotational axis Ax by a hinge mechanism 4 between an open state illustrated in FIG. 1 and a close state not illustrated. In the present embodiment, the first main body 2 corresponds to a device main body. The hinge mechanism 4 rotatably connects an end portion of the first main body 2 and an end portion of the second main body 3 with respect to each other.

Operation input portions such as a keyboard 5, a pointing device 7, and a click button are provided to the first main body 2 so as to be exposed at a side of a surface 2b which is an exterior face of a housing 2a. On the other hand, a display 6 (display device comprising a display screen) such as a liquid crystal display (LCD) is provided as an electronic component so as to be exposed at a side of a surface 3b which is an external face of a housing 3a. Under the open state, the keyboard 5, the display 6, and the like are exposed so that the user can use the same. On the other hand, under the close state, the surface 2b and the surface 3b are placed near each other and oppose each other. Hence, under the close state, the keyboard 5, the display 6, the pointing device 7, a click button 8, and the like are hidden by the housing 2a and the housing 3a. In FIG. 1, keys 5a are only illustrated as a portion of the keyboard 5.

Figure 2:
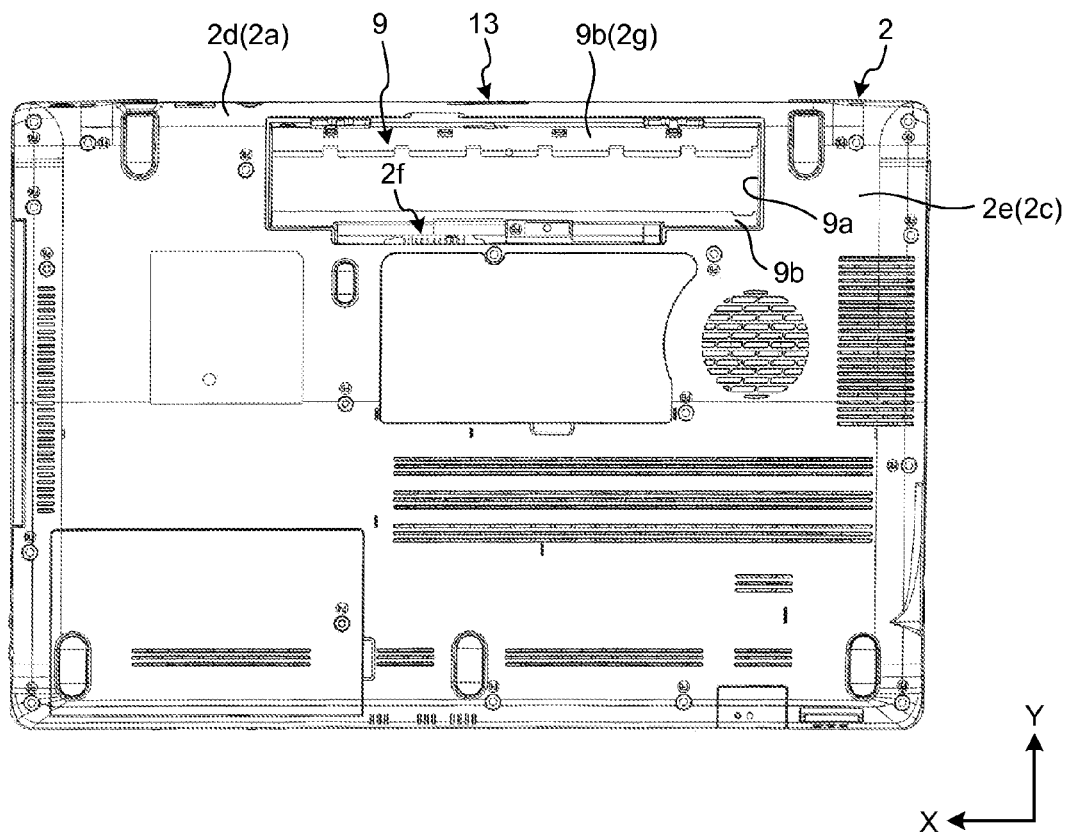
FIG. 2 is an exemplary plan view of a first main body of the electronic device as seen from a bottom face side thereof in the embodiment.
Figure 3:
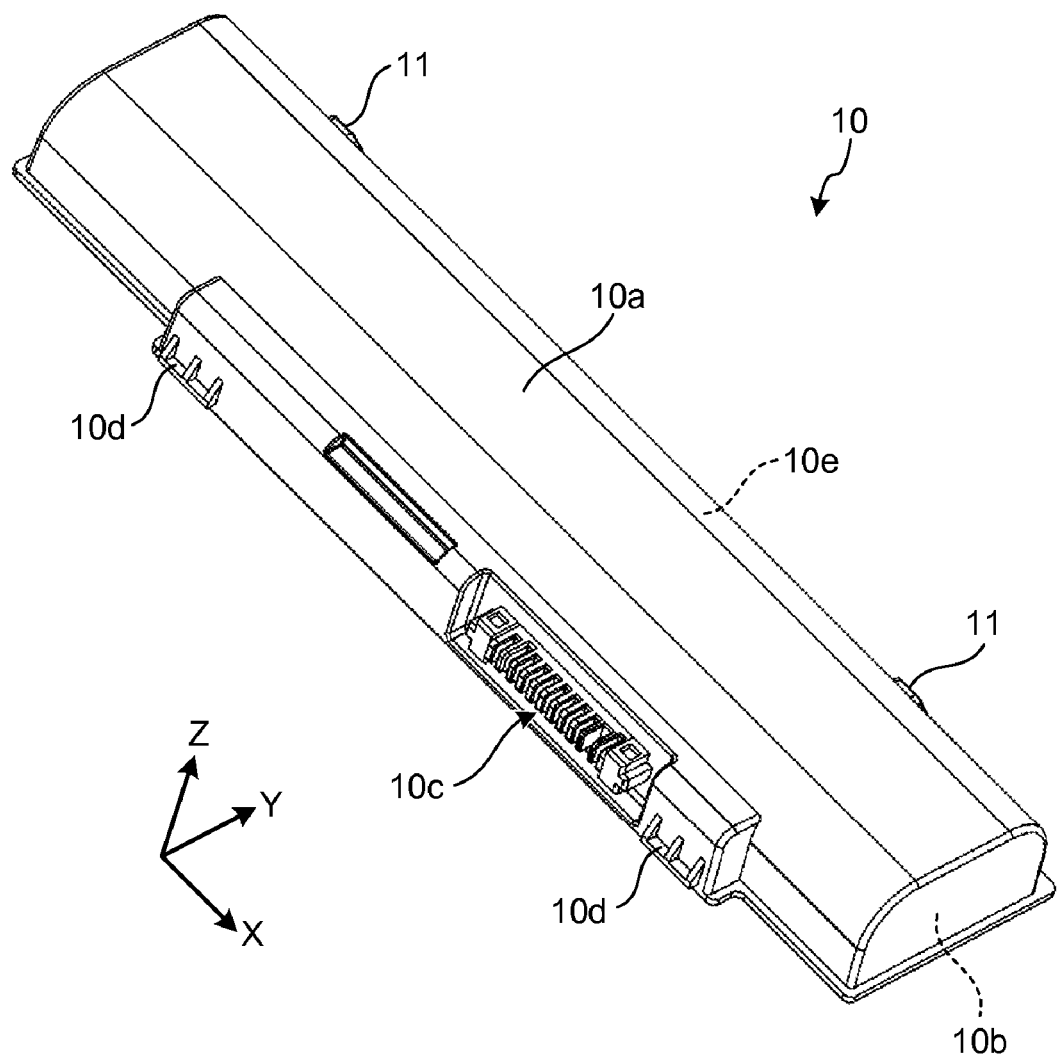
FIG. 3 is an exemplary perspective view of a battery detachably housed in a component container formed in the first main body in the embodiment.

As illustrated in FIG. 2, a depressed portion 9 is formed at an end portion and at a rear side (a side near a rear wall 2d which is a side wall (periphery wall) at the rear side) of a bottom wall (wall portion) of the housing 2a, as a component container. In the depressed portion 9, a battery 10 which is a component (module) illustrated in FIG. 3 is housed. The YZ cross section of an exterior face 10a of the battery 10 is formed in an inverted U-shape swelling out upwards. Further, the battery 10 is formed in an elongated shape in the X direction. Accordingly, the YZ cross section of an interior face of the depressed portion 9 is formed in an inverted U-shape with the depressed portion 9 being opened downwards and formed in a depressed groove shape extending in the X direction. In the present embodiment, the battery 10 itself functions as a cover of the depressed portion 9. In other words, when the battery 10 is housed and mounted in the depressed portion 9, a bottom face 10b of the battery 10 and a bottom face 2e of a bottom wall 2c become continuous so that one complete bottom face is formed. The housing 2a can be configured by using a metal material, a synthetic resin material, and the like.

As illustrated in FIG. 3, a connector 10c where a plurality of terminals are exposed is provided to the battery 10. The connector 10c is mounted on a connector 2f provided on an interior face 9b of the depressed portion 9. At an end edge provided at a lower front side of the battery 10, protruding portions 10d are provided so that the connector 10c is sandwiched therebetween. The protruding portions 10d are engaged with the bottom wall 2c of the housing 2a.

Figure 4:
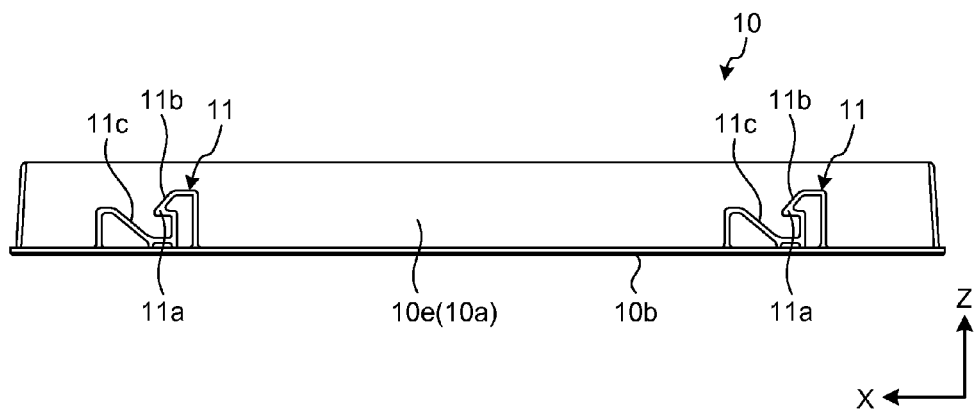
FIG. 4 is an exemplary side view of the battery in the embodiment.

As illustrated in FIG. 4, ribs 11 are formed at a rear face 10e which is the exterior face 10a at the rear side of the battery 10. The two ribs 11 are arranged spaced apart in an elongated direction (i.e., X direction) of the battery 10. In the embodiment, the two ribs 11 have the same shape. In each of the ribs 11, an second engage portion 11a is formed as a section protruding sideway (width direction of the first main body 2, X direction). The second engage portion 11a is to be engaged with a protrusion 12 (see FIG. 5) which is the first engage portion of the first main body 2. A slope at an upper side of the second engage portion 11a is a guide portion 11b for guiding the protrusion 12 when the battery 10 is housed in the depressed portion 9. A slope at a side of the second engage portion 11a is a press portion for receiving force from the protrusion 12 in a detaching direction (i.e., downward). The relative movement of the protrusion 12 and the rib 11 is explained in details later.

Figure 5:
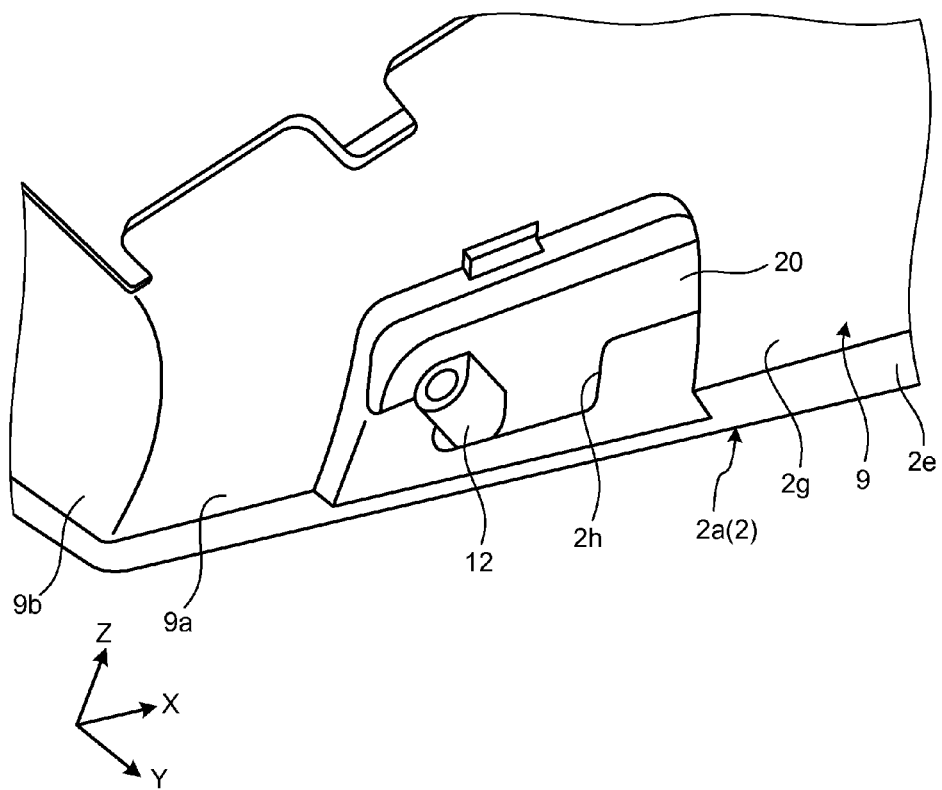
FIG. 5 is an exemplary perspective view of a first engage portion of the first main body facing the component container in the embodiment.

As illustrated in FIG. 5, the protrusion 12 which is the first engage portion is provided to the first main body 2 so as to face the depressed portion 9. The protrusion 12 is formed in a cylindrical shape with a portion thereof being square. At a rear side partition wall 2g forming a rear portion of the interior face 9b of the depressed portion 9, an opening portion 2h is formed to correspond to the protrusion 12. The protrusion 12 protrudes from inside the housing 2a frontward towards inside the depressed portion 9, through the opening portion 2h.

Figure 6:
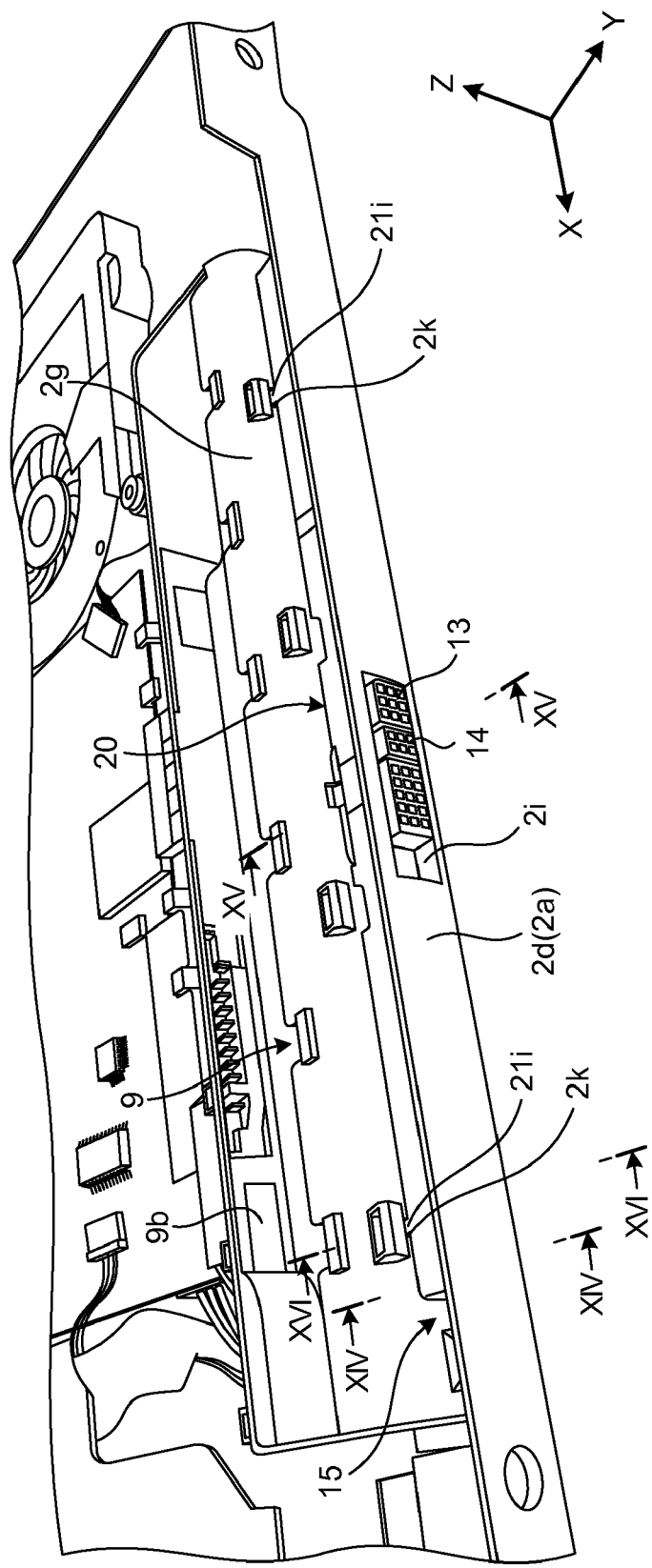
FIG. 6 is an exemplary perspective view of a depressed groove portion provided inside the first main body and a disengage unit housed in the depressed groove portion in the embodiment.

As illustrated in FIG. 6, an opening portion 2i is formed on the rear wall 2d which is a side wall extending along the width direction (Y direction) of the first main body 2 at the rear side thereof. An operating element (slider) 13 dealing with the attachment and detachment of the battery 10 is exposed from the opening portion 2i outwards (towards the rear side). An operator can change a state of mount of the battery 10 with respect to the first main body 2 by the operation of the operating element 13. In the embodiment, the operating element 13 is configured to be slidable back and forth along in the width direction. When the operating element 13 is at a right side of FIG. 6 (engage position), the battery 10 is mounted to the first main body 2. When the operator moves the operating element 13 leftward in FIG. 6 (disengage position), the battery 10 is removed from the first main body 2. A lock operating element (lock portion) 14 which is slidable up and down is attached to the operating element 13. In the embodiment, when the operator slides the lock operating element 14 upwards while the operating element 13 is at a right side of FIG. 6, the relative movement of the operating element 13 leftward with respect to the first main body 2 is regulated. Accordingly, the battery 10 is locked with respect to the first main body 2.

As illustrated in FIG. 6, the housing 2a of the first main body 2 comprises the rear side partition wall 2g at the front side of the rear wall 2d. The rear side partition wall 2g is extending along the rear wall 2d. A depressed groove portion 15 is formed between the rear wall 2d and the rear side partition wall 2g. The depressed groove portion 15 is thin, extends along the width direction (Y direction) of the first main body 2, and opened upwards. In the depressed groove portion 15, an operation unit 20 for moving the protrusion 12 in accordance with the operation of the operating element 13 is housed. The protrusion 12 is the first engage portion. A disengage mechanism for disengaging the battery 10 with respect to the first main body 2 is configured by this operation unit 20. That is to say, the operation unit 20 corresponds to the disengaging unit. Further, the operation unit 20 corresponds to a lock unit for locking the engagement of the battery 10 with respect to the first main body 2 by the operation of the aforementioned lock operating element 14.

Next, detailed configurations of the operation unit 20 and the depressed groove portion 15 are explained. In the following explanations of each component, if not specifically mentioned, directions are considered while each component being attached to the first main body 2.

Figure 7:
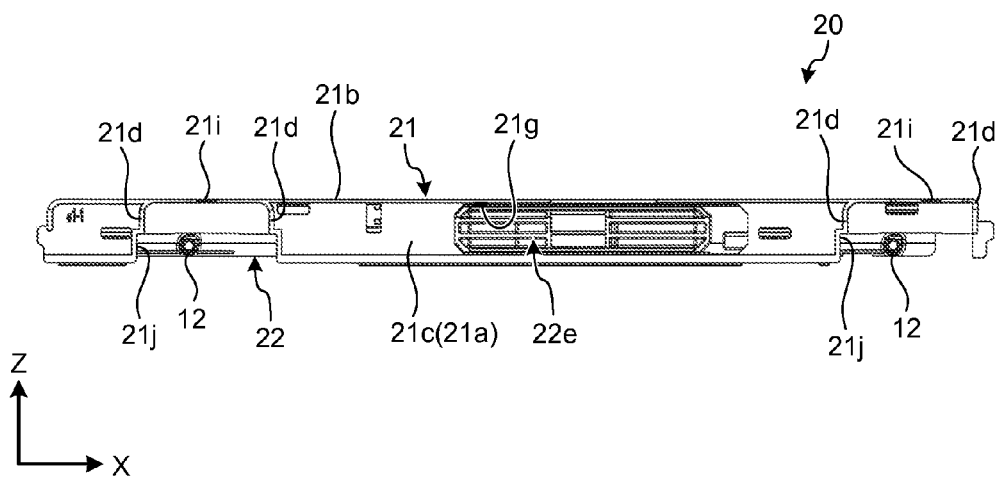
FIG. 7 is an exemplary front view of the disengage unit as seen from front thereof in the embodiment.
Figure 8:
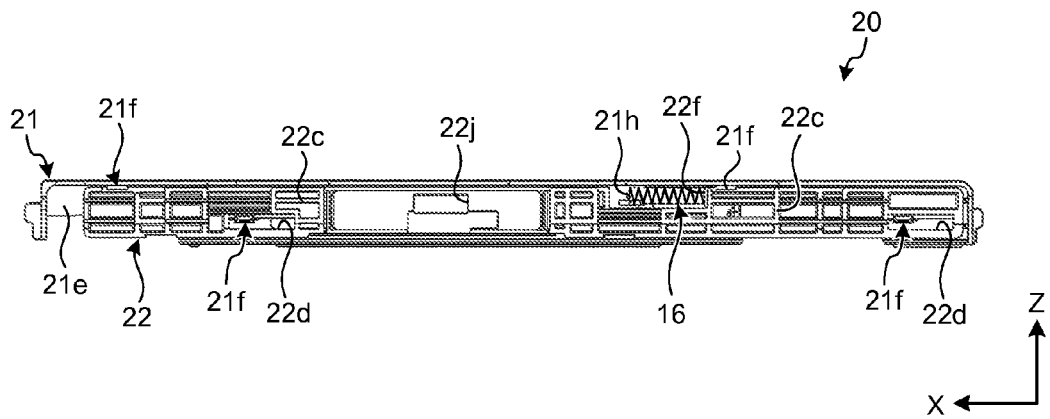
FIG. 8 is an exemplary back view of the disengage unit as seen from back thereof in the embodiment.

As illustrated in FIGS. 7, 8, and the like, the operation unit 20 comprises: a base member 21 housed inside the depressed groove portion 15 and fixed to the housing 2a; and a slide member 22 supported by the base member 21 so as to be relatively slidable with respect to the base member 21. The slide member 22 relatively moves back and forth with respect to the base member 21 in the extending direction (i.e., width direction of the first main body 2, X direction) of the depressed groove portion 15.

Figure 10:
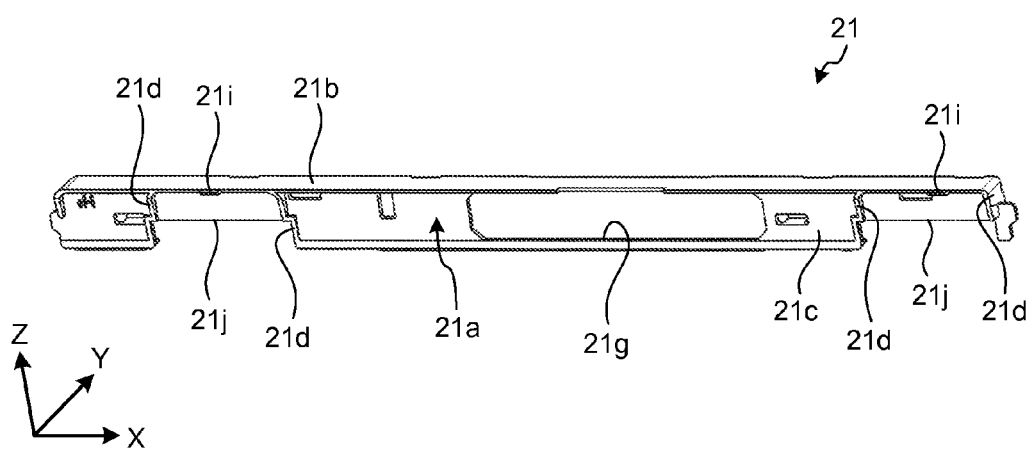
FIG. 10 is an exemplary perspective view of a front face side of a base member of the disengage unit in the embodiment.
Figure 11:
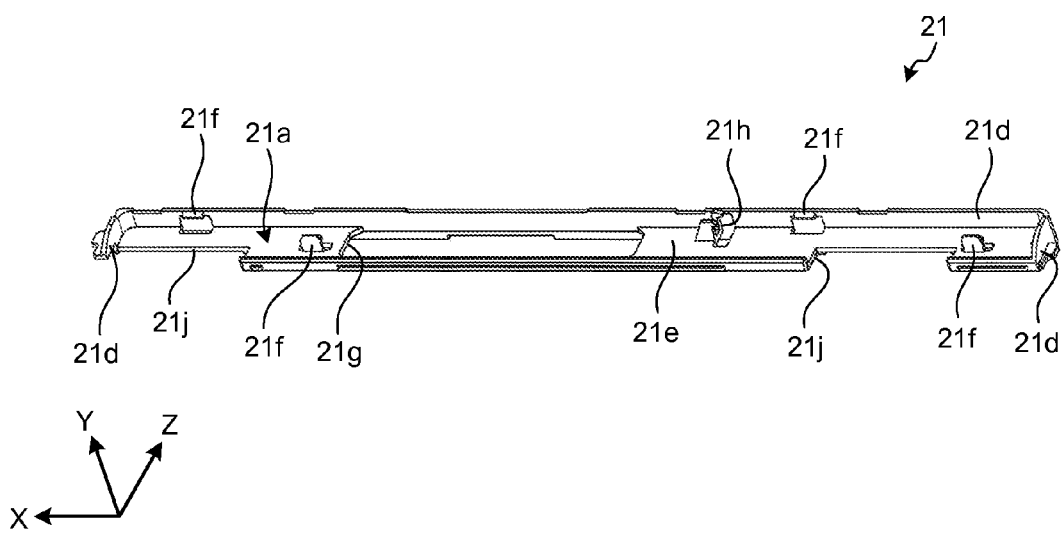
FIG. 11 is an exemplary perspective view of a back face side of the base member in the embodiment.

As illustrated in FIGS. 10 and 11, the base member 21 comprises a longitudinal wall 21a and a top wall 21b. The longitudinal wall 21a is formed to have a strip shape in the XZ plane. The top wall 21b is connected to an upper end portion of the longitudinal wall 21a, and formed to have a strip shape in the XY plane. The longitudinal wall 21a and the top wall 21b form a cross section of T-shape. In the embodiment, the longitudinal wall 21a corresponds to a base member main body.

Figure 12:
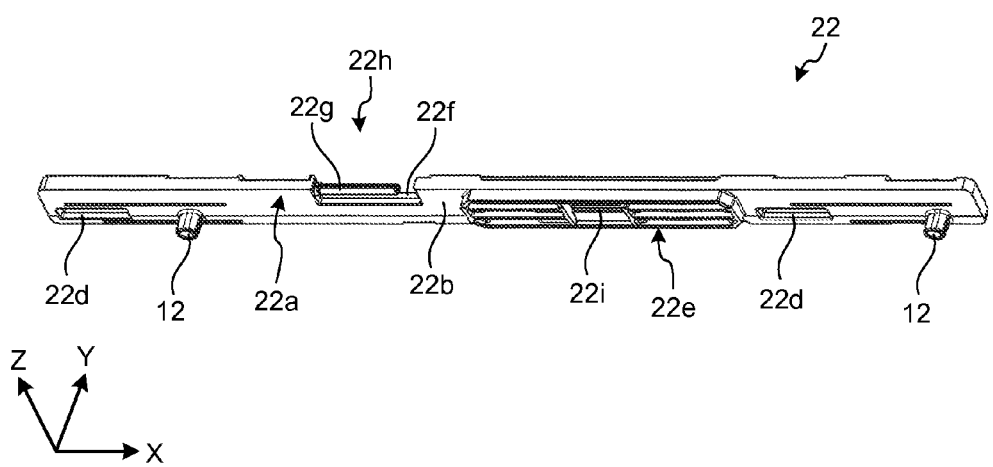
FIG. 12 is an exemplary perspective view of a front face side of a slide member of the disengage unit in the embodiment.
Figure 13:
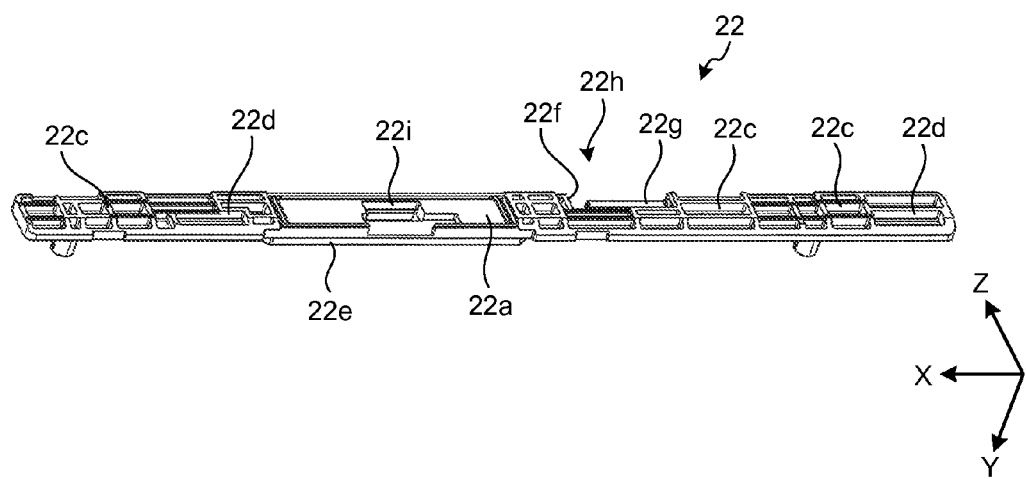
FIG. 13 is an exemplary perspective view of a back face side of the slide member in the embodiment.

As illustrated in FIGS. 12 and 13, the slide member 22 comprises a longitudinal wall 22a formed to have a strip shape in the XZ plane. As illustrated in FIG. 12, a front face 22b of the longitudinal wall 22a is formed in a plane shape. On the other hand, as illustrated in FIG. 13, a rib 22c having a mesh shape is provided at a rear portion of the longitudinal wall 22a. In the embodiment, the longitudinal wall 22a comprising the rib 22c corresponds to a slide member main body.

As is clear from FIG. 7 in which the operation unit 20 is seen from the front side and from FIG. 8 in which the operation unit 20 is seen from the rear side, in the embodiment, the longitudinal wall 21a which is the base member main body is arranged at a front side with respect to the longitudinal wall 22a which is the slide member main body. That is to say, the longitudinal wall 21a is arranged at a side of the rear side partition wall 2g, with respect to the longitudinal wall 22a which is the slide member main body.

A rib 21d is formed on a front face 21c and a back face 21e of the longitudinal wall 21a of the base member 21. The rib 21d protrudes towards the rear side partition wall 2g and the rear wall 2d. When force is applied frontward by the operating element 13 with respect to the base member 21, the rib 21d comes in contact with the rear side partition wall 2g. Accordingly, the base member 21 is supported by the rear side partition wall 2g.

As illustrated in FIG. 11, the back face 21e of the longitudinal wall 21a of the base member 21 is formed in a plane shape. The front face 22b having the plane shape of the longitudinal wall 22a of the slide member 22 is placed and comes in contact with the back face 21e. At the side of the back face 21e of the longitudinal wall 21a, a plurality of locking protrusions 21f are formed so that the locking protrusions 21f are separated from each other in the upward and downward direction (Z direction) and the width direction (X direction) of the first main body 2. The longitudinal wall 22a of the slide member 22 is sandwiched by the locking protrusions 21f in the upward/downward direction and the front/back direction. As illustrated in FIG. 12, slits 22d into which the locking protrusions 21f are inserted are formed on the longitudinal wall 22a.

As illustrated in FIG. 12, a guide protrusion 22e and the protrusion 12 are formed on the front face 22b of the longitudinal wall 22a of the slide member 22. The guide protrusion 22e is elongated in an elongate direction (X direction) of the slide member 22. The protrusion 12 is the first engage portion. As illustrated in FIGS. 7, 10, and 11, a guide slit 21g into which the guide protrusion 22e is inserted is formed on the longitudinal wall 21a of the base member 21. At a lower end edge of the base member 21, a cutout portion 21j is formed. The protrusion 12 protrudes frontward through a cutout portion 22f.

As illustrated in FIGS. 12 and 13, a spring support portion 22h is formed at an upper portion on a side of a top wall 2j of the slide member 22. The spring support portion 22h supports a coil spring 16 which is a bias member, and has the cutout portion 22f and a guide rod 22g. On the other hand, as illustrated in FIG. 11, a support protrusion 21h is provided at an upper portion of the base member 21. The support protrusion 21h is housed in the cutout portion 22f, and arranged so as to be spaced apart from a distal end portion of the guide rod 22g. The coil spring 16 is arranged along an extending direction (X direction) of the depressed groove portion 15 between the distal end portion of the guide rod 22g and the support protrusion 21h, and function as a compression spring. The slide member 22 is biased towards one side (rightward in FIG. 8) of the extending direction (X direction) of the depressed groove portion 15 with respect to the base member 21, by the coil spring 16. This direction is set in a direction in which the force of engagement between the second engage portion 11a and the protrusion 12 which is the first engage portion increases.

A through hole 22i is formed on the slide member 22. The operation unit 20 is housed in the depressed groove portion 15, and fixed in the housing 2a of the first main body 2. Then, a projection (not illustrated) of the operation element 13 is inserted into the through hole 22i from outside through the opening portion 2i formed on the rear wall 2d. Consequently, the operation element 13 is fixed to the slide member 22. The lock operating element 14 is slidably supported with respect to the operation element 13, and is attached to the slide member 22 together with the operation element 13.

Figure 9:
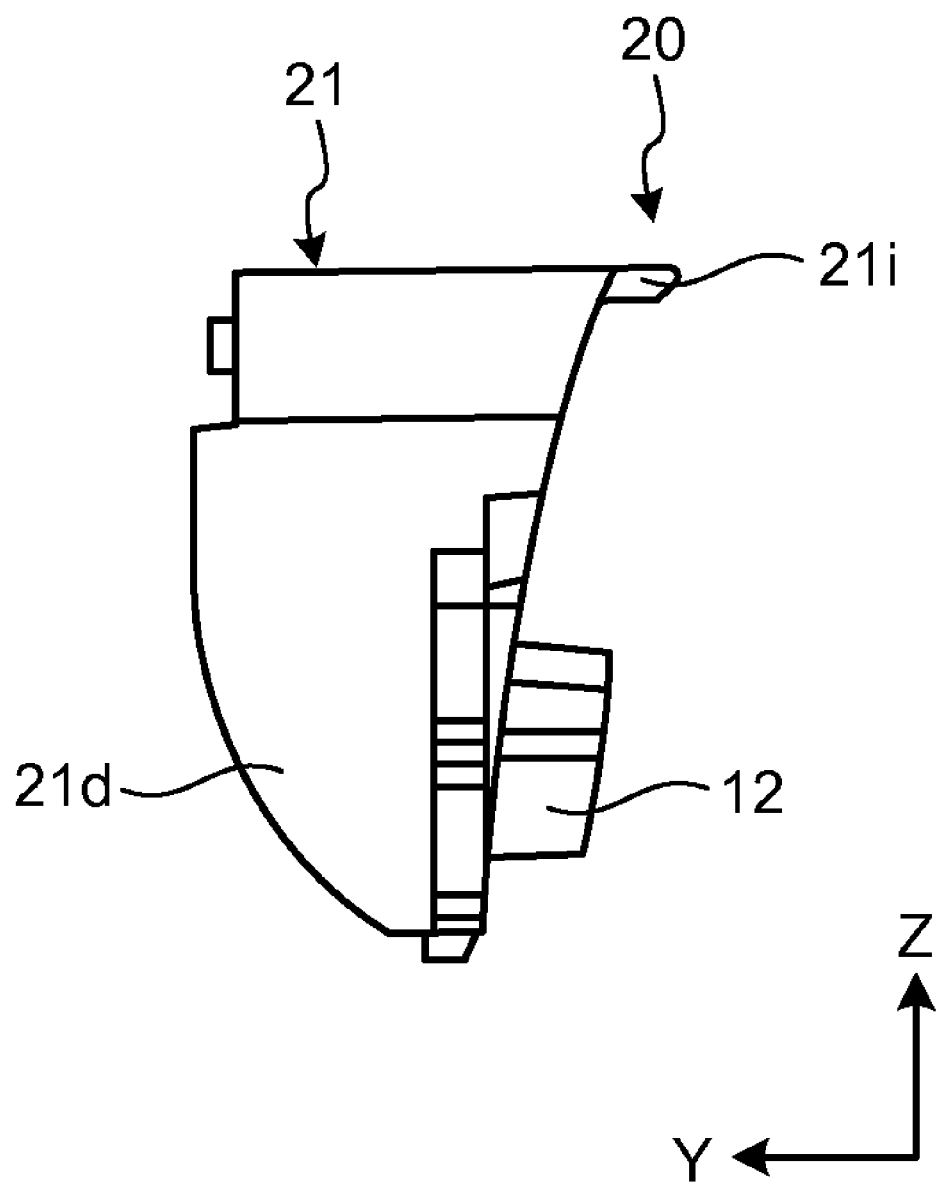
FIG. 9 is an exemplary side view of the disengage unit as seen in a width direction of the first main body in the embodiment.
Figure 14:
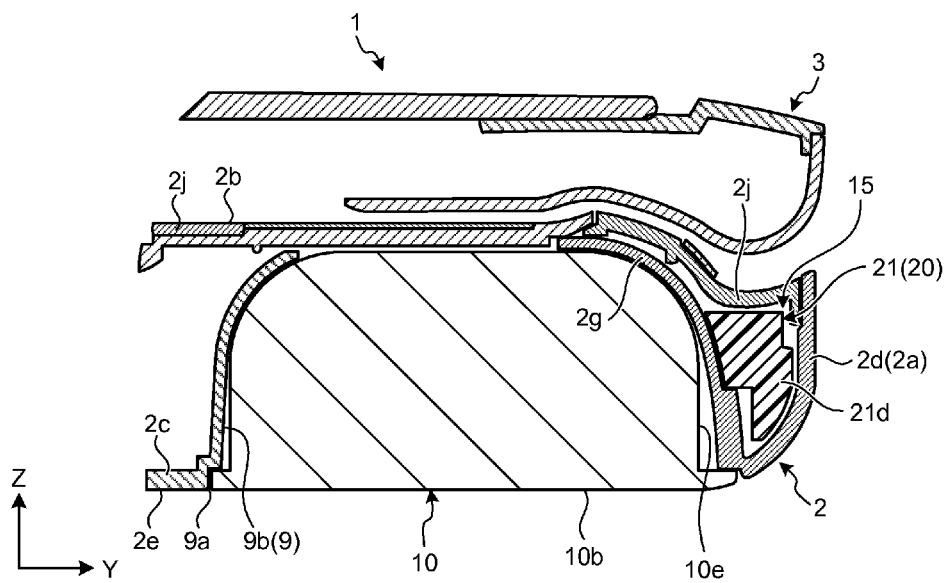
FIG. 14 is an exemplary cross sectional view taken along a line XIV-XIV of FIG. 6 in the embodiment.
Figure 15:
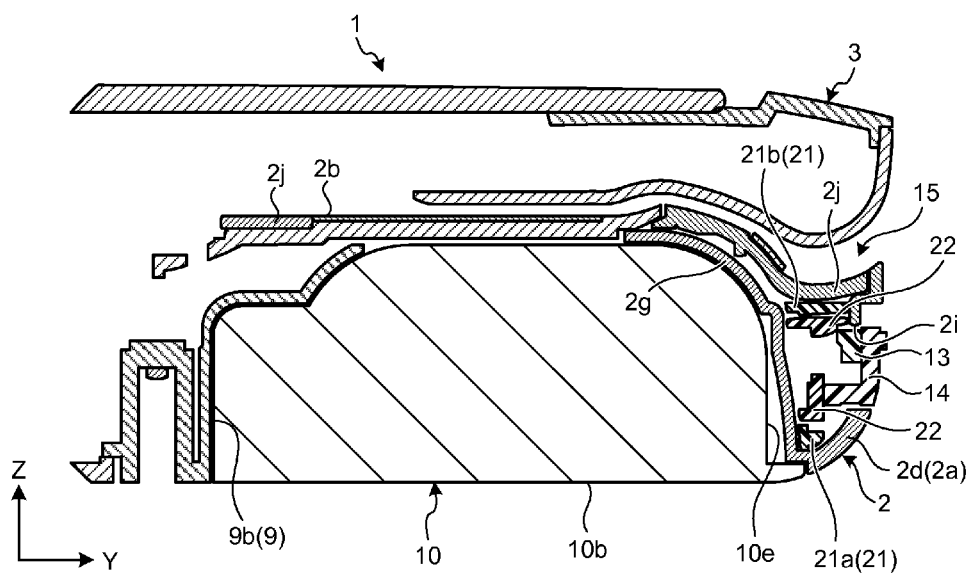
FIG. 15 is an exemplary cross sectional view taken along a line XV-XV of FIG. 6 in the embodiment.
Figure 16:
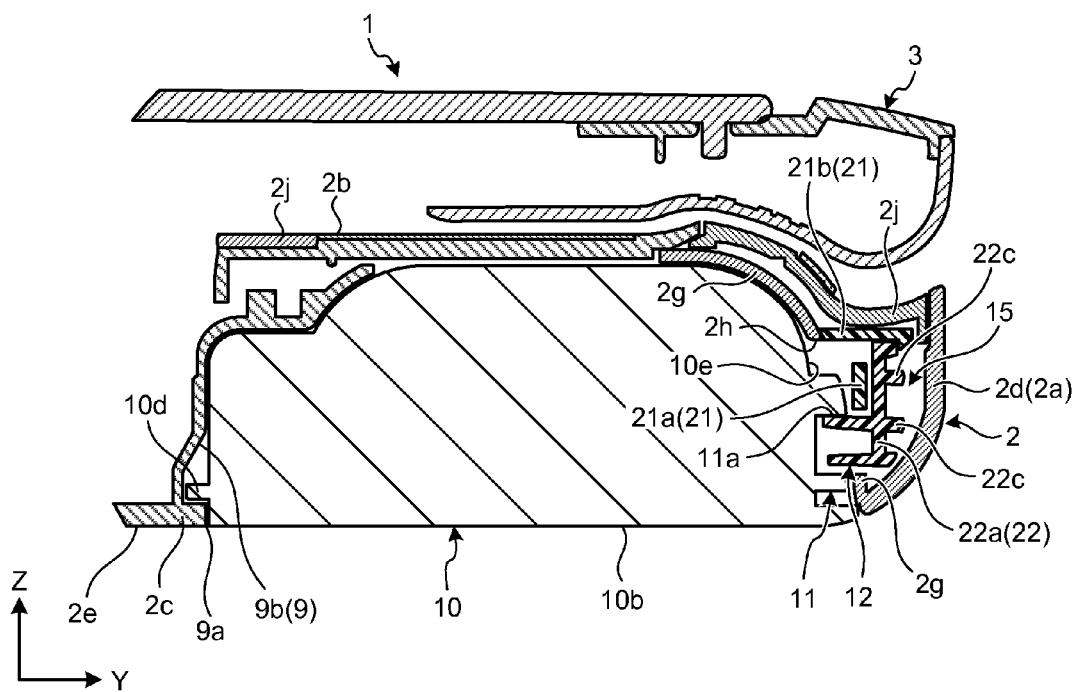
FIG. 16 is an exemplary cross sectional view taken along a line XVI-XVI of FIG. 6 in the embodiment.

As illustrated in FIGS. 14 to 16, the bottom portion of the rear wall 2d of the first main body 2 is bent so as to be projected obliquely downward and rearward. The rear side partition wall 2g is bent so as to be projected obliquely upward and rearward. An angle of inclination of the rear side partition wall 2g increases upward. That is to say, the depressed groove portion 15 has a V-shaped cross section opening toward the top wall 2j. In the embodiment, a protrusion 21i (see FIG. 9) provided on the base member 21 of the operation unit 20 is locked with respect to a depressed portion 2k (see FIG. 6) formed on the housing 2a, a protrusion, or the like, so as to regulate the operation unit 20 from moving toward the opening side (upward) of the depressed groove portion 15. Since the depressed groove portion 15 is formed in the V-shape, the motion of the operation unit 20 frontward and backward (width direction of the depressed groove portion 15, Y direction) can be regulated by regulating the movement of the operation unit 20 toward the opening. That is to say, in the embodiment, the protrusion 21i and the depressed portion 2k corresponds to the lock mechanism. It can be further securely suppressed for the operation unit 20 to be removed from the depressed groove portion 15 by covering the opening side of the depressed groove portion 15 by the top wall 2j (for example, hinge cover and the like).

As illustrated in FIG. 14, at both end portions in the elongated direction of the operation unit 20, the rib 21d of the base member 21 is sandwiched between the rear wall 2d and the rear side partition wall 2g. In the cross section of FIG. 15, the operation element 13 and the lock operating element 14 penetrates through the opening portion 2i of the rear wall 2d, and connected to the slide member 22. In the cross section of FIG. 16, the protrusion 12 which is the first engage portion penetrates through the opening portion 2h of the rear side partition wall 2g, and engages with the second engage portion 11a of the rib 11.

Figure 17:
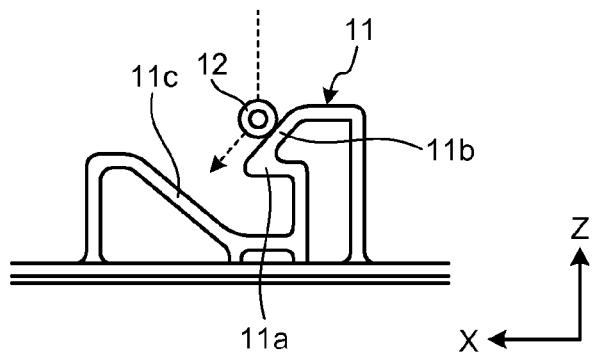
FIG. 17 is an exemplary schematic diagram illustrating a positional relationship between a first engage portion and a second engage portion in a state before the component is housed in the component container in the embodiment.

Next, the engagement and disengagement of the protrusion 12 which is the first engage portion and the second engage portion 11a are explained with reference to FIGS. 17 to 19. When the rib 11 of the battery 10 comes close to the protrusion 12, the protrusion 12 moves relatively downward of FIG. 17, and makes contact with the guide portion 11b of the rib 11. The guide portion 11b moves the protrusion 12 leftward in FIG. 17. At this moment, the protrusion 12 moves along the guide portion 11b because the protrusion 12 is biased rightward in FIG. 17 by the coil spring 16 of the operation unit 20.

Figure 18:
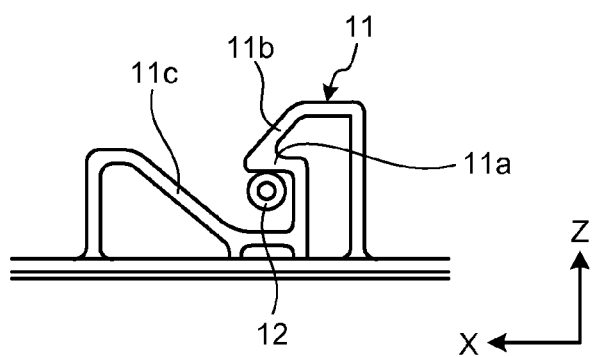
FIG. 18 is an exemplary schematic diagram illustrating a positional relationship between the first engage portion and the second engage portion in a state when the component is housed in the component container in the embodiment.
Figure 19:
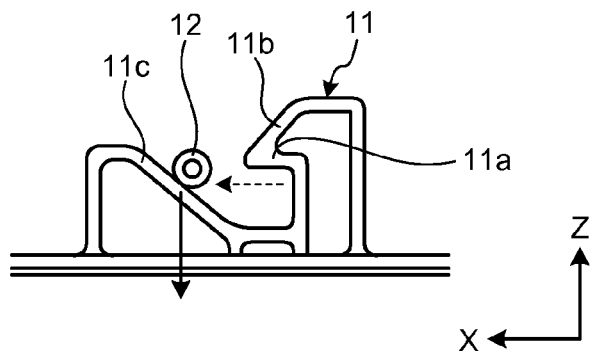
FIG. 19 is an exemplary schematic diagram illustrating a positional relationship between the first engage portion and the second engage portion in a state when the component is detached from the component container in the embodiment.

When the battery 10 moves deep into (i.e., upward) the depressed portion 9, the protrusion 12 relatively moves downward in FIG. 18. Then, the protrusion 12 moves over the second engage portion 11a counterclockwise on FIG. 18, and moves to lower side of the second engage portion 11a. As described above, the protrusion 12 is biased rightward in FIG. 18 by the coil spring 16, and the engagement between the second engage portion 11a and the protrusion 12 as the first engage portion is maintained. Then, under the state illustrated in FIG. 18, the relative movement of the operation element 13 and the slide member 22 is regulated by the lock operating element 14, and the protrusion 12 is locked while the second engage portion 11a is engaged thereto.

In the embodiment, in order to unlock the engagement, the lock operating element 14 is moved downward to be unlocked. Then, the operation element 13 is moved toward disengaging side (leftward in FIG. 6 in the embodiment). As a result, the slide member 22 moves in response to the movement of the operation element 13, and the protrusion 12 is relatively moves leftward in FIG. 19 with respect to the rib 11. When the protrusion 12 pushes a pressed portion 11c of the rib 11, the battery 10 or in other words the rib 11 receives downward force due to the angled contact face of the pressed portion 11c. That is to say, the force by the operator that slid the operation element 13 is transferred to the pressed portion 11c of the rib 11 through the slide member 22 and the protrusion 12, and the battery 10 is removed from the depressed portion 9 by the slope (i.e., slope toward far side (upward) of the depressed portion 9 as the component container along the direction of movement of the protrusion 12) of the contact face of the pressed portion 11c.

As described above, in the embodiment, the operation element 13 is provided on the rear wall 2d, which is a side wall extending in a width direction of the electronic device 1 and positioned at a far side of the first main body 2 as seen by a user while the electronic device 1 is in use. Therefore, in comparison to the case when the operation element 13 is provided on a left wall, a right wall (periphery wall), and the like, it is difficult for the operator to reach the operation element 13 by hand. As a result, the operation element 13 can be prevented from being mistakenly operated. Especially, since the operation element 13 is provided at a center position of the rear wall 2d in the embodiment, access to the operation element 13 by both of the user's hands can be suppressed.

In the embodiment, the component container is formed as the depressed portion 9 opening at the bottom wall 2c of the first main body 2 and at the end portion on the side of the rear wall 2d. Further, the depressed groove portion 15 opening toward the top wall 2j of the first main body 2 is formed between the rear wall 2d of the first main body 2 and the rear side partition wall 2g of the first main body 2 forming the depressed portion which is the component container. Then, the operation unit 20 comprising the base member 21 and the slide member 22 is housed in the depressed groove portion 15. The slide member 22 is provided with the protrusion 12 as the first engaged portion. The protrusion 12 is moved by the operation element 13, and is slidably supported by the base member 21 in the extending direction of the depressed groove portion 15. Therefore, the space between the rear side partition wall 2g and the rear wall 2d can effectively be used to arrange the disengaging mechanism. Further, in comparison to the case when each component is directly assembled to the first main body 2, since the disengaging mechanism is unitized to configure the operation unit 20, a number of steps of manufacture can be reduced. Further, since there exist the operation unit 20 between the rear wall 2d and the rear side partition wall 2g, rigidity of the portion where the depressed groove portion 15 of the housing 2a is formed can be increased.

In the embodiment, the depressed groove portion 15 has the V-shaped cross section, and the protrusion 21i and the depressed portion 2k are provided as the lock mechanism regulating the operation unit 20 from being moved to a release side of the depressed groove portion 15. Since the depressed groove portion 15 is formed to have the V-shape, in addition to the upward and downward directions, the operation unit 20 can be positioned with respect to the direction (in the embodiment, depth direction) in which the operation unit 20 is sandwiched by the rear wall 2d and the rear side partition wall 2g, by regulating through the lock mechanism the operation unit 20 from being moved to the release side.

In the embodiment, the longitudinal wall 21a as the base member main body is arranged at the side of the rear side partition wall 2g, with respect to the longitudinal wall 22a as the slide member main body. Hence, the force input toward the side of the rear side partition wall 2g from the side of the rear wall 2d via the operation element 13 can be received by the longitudinal wall 21a arranged at the side to which the force is input, so that, in comparison to the case when the force is received by a member arranged at a side from which the force is input, the pressure receiving area can widely be secured with comparatively easy configuration. As a result, the reaction force of the base member 21 can be comparatively easier to be decreased, so as to be capable of increasing the durability of the operation unit 20.

In the embodiment, the coil spring 16 is arranged at the side of the top wall 2j, which is the opening side of the V-shaped depressed groove portion 15. Here, the coil spring 16 is the bias mechanism for biasing the slide member 22 with respect to the base member 21, toward one side in the extending direction of the depressed groove portion 15. That is to say, the coil spring 16 is arranged at the opening side (top wall 2j side) which, in comparison to the further side of the V-shaped depressed groove portion 15 having thin end, can easily secure the space. As a result, the bias force of the coil spring 16 can easily be secured.

In the embodiment, the protrusion 12 is provided to the operation unit 20 as the first engage portion, and the rib 11 with the guide portion 11b guiding the movement of the protrusion 12 is provided to the battery 10. Hence, in comparison to the configuration in which a guide portion provided to an operation unit side is moved, the operation unit 20 can be configured simpler and smaller. Thus, the operation unit 20 can be provided in a smaller space. That is to say, such configuration is effective for the case when the operation unit 20 (disengage mechanism) is to be provided in a smaller space as in the present embodiment.

In the embodiment, the guide portion 11b guiding the protrusion 12 as the engage portion is formed by the rib 11. When the guide portion is formed as a depressed groove, an internal volume of the battery 10 is to be impaired. In the embodiment, since the guide portion 11b is formed by the rib 11 on the external face 10a of the battery 10, the internal volume loss of the battery 10 can be suppressed in comparison to the case when the rib is formed as the depressed groove. Further, the provision of the rib 11 can increase the rigidity of the battery 10 for the amount corresponding to the rib 11 itself.

In the embodiment, the pressed portion 11c pressed by the protrusion 12 which is the first engage portion is provided on the battery 10. As described above, the slope face is formed on the pressed portion 11c for converting the latitudinal movement (X direction) of the operation element 13 and the slide member 22 thereof to the downward release movement (Z direction) of the battery 10. When the press portion having the slope face is provided on the side of the operation unit, the press portion and further the operation unit tend to become larger in size in the upward and the downward direction in accordance with the stroke. In the embodiment, since the pressed portion 11c is provided on the side of the battery 10, the operation unit 20 can be configured simpler and smaller. Hence, the operation unit 20 can be arranged in a limited space. That is to say, the configuration is effective for the case when the operation unit 20 (disengage mechanism) is provided in the limited space as mentioned in the present embodiment.

The embodiments described hereinbefore can be implemented as an electronic device other than the notebook type personal computer. Further, the embodiments can be implemented as a component other than the battery. Further, the component container, the first engage portion, the disengage portion, the operation element, the depressed groove portion, the disengage unit, the clock mechanism, the bias mechanism, the guide portion, the pressed portion, and the specification of the rib and the like (arrangement, quantity, size, shape, material, and the like) can appropriately be changed and implemented.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a module comprising an engaging portion;
   a housing comprising:
      a rear end portion;
      a wall portion comprising an opening configured to house the module; and
      a periphery wall provided at a periphery of the wall portion;
   a partition wall spaced apart from the periphery wall near the rear end portion of the housing and extending along the periphery wall, the partition wall forming at least part of the opening;
   a unit housed in a space between the periphery wall and the partition wall, the space having a V-shape cross section and the unit comprising:
      a base member;
      a slider portion slidably supported by the base member, the slider portion being configured to be movable between an engaged position at which the slider portion is engaged with the engaging portion and a disengaged position at which the slider portion is disengaged from the engaging portion; and
      a lock portion integrally provided with the slider portion and configured to fix the slider portion to a predetermined position; and
   a lock mechanism configured to regulate the unit so that the unit is not disengaged toward a wider side of the V-shaped space.

2. The electronic device of claim 1, wherein a main body of the base member is arranged on a side of the partition wall with respect to a main body of the slider portion.

3. The electronic device of claim 2, wherein the unit comprises a bias mechanism arranged on a side of the wider side of the V-shaped space, the bias mechanism biasing the slider portion toward one side of a direction along the periphery wall of the space with respect to the base member.

4. The electronic device of any one of claims 1, wherein, when the module is attached to or detached from the opening, a second engaging portion, which is provided to the slider portion and is configured to engage with the engaging portion, is guided by a guide portion provided to the module and moved.

5. A module detachably housed in the opening of the electronic device of claim 1.

6. The module of claim 5, further comprising a guide portion guiding movement of the second engaging portion, which is provided to the slider portion and is configured to engage with the engaging portion, when the module is attached to or detached from the opening.

7. The module of claim 6, wherein the guide portion comprises a rib protruding from a surface of the module.

8. The module of claim 6, further comprising a pressed portion pressed by the second engaging portion slid in response to movement of the slider portion.

* * * * *